(12) United States Patent  (10) Patent No.: US 7,466,332 B2
Yoo  (45) Date of Patent: Dec. 16, 2008

(54) LIGHT SCANNING UNIT

(75) Inventor: Jae-hwan Yoo, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 187 days.

(21) Appl. No.: 11/142,409

(22) Filed: Jun. 2, 2005

(65) Prior Publication Data

US 2005/0270363 A1    Dec. 8, 2005

(30) Foreign Application Priority Data

Jun. 3, 2004    (KR) ...................... 10-2004-0040328

(51) Int. Cl.
*B41J 2/435*  (2006.01)
*B41J 2/47*   (2006.01)

(52) U.S. Cl. ...................... 347/234; 347/248

(58) Field of Classification Search ................ 347/116, 347/241–244, 256–261, 234–235, 248–250, 347/259–260; 358/480; 359/201, 210
See application file for complete search history.

(56) References Cited

U.S. PATENT DOCUMENTS 5,054,866 A * 10/1991 Tomita et al. ............... 359/201
5,606,449 A *  2/1997 Nishiyama ................. 359/210
6,175,440 B1   1/2001 Conemac
6,906,832 B2 * 6/2005 Furukawa et al. ........... 358/480

FOREIGN PATENT DOCUMENTS

| JP | 63-316821     |   | 12/1988 |
|----|---------------|---|---------|
| JP | 06-034903     |   |  2/1994 |
| JP | 11153765   A  | * |  6/1999 |
| JP | 11-249050     |   |  9/1999 |
| JP | 2000-206434   |   |  7/2000 |
| JP | 2001-100130   |   |  4/2001 |
| JP | 2001133721 A  | * |  5/2001 |
| JP | 2003-132580   |   |  5/2003 |
| KR | 00-0007318    |   |  4/2000 |
| KR | 100364405     |   | 11/2002 |

* cited by examiner

*Primary Examiner*—Hai C Pham
(74) *Attorney, Agent, or Firm*—Roylance, Abrams, Berdo & Goodman, L.L.P.

(57) ABSTRACT

A light scanning unit that corrects skew of a scanning line. The light scanning unit, which scans light on an exposed surface of a photosensitive medium, includes a light source to generate and illuminate at least one beam that corresponds to an image signal while being controlled on and off. A beam deflector deflects and scans a beam provided from the light source. A reflection mirror is obliquely arranged so that a scanning line directed to the exposed surface may be inclined with respect to a segment perpendicular to a transferring direction of the exposed surface to direct the scanning line to the exposed surface of the photosensitive medium by reflecting the scanning line provided from the beam deflector.

14 Claims, 5 Drawing Sheets

LIGHT SCANNING UNIT

CROSS REFERENCE TO RELATED APPLICATIONS

This application claims the benefit under 35 U.S.C. § 119 (a) of Korean Patent Application No. 10-2004-0040328, filed on Jun. 3, 2004, in the Korean Intellectual Property Office, the entire disclosure of which is hereby incorporated reference.

BACKGROUND OF THE INVENTION

1. Field of the Invention

The present invention relates to a light scanning unit for scanning a beam illuminated from a light source. More particularly, the present invention relates to a light scanning unit having an improved structure capable of correcting a skew of a scanning line.

2. Description of the Related Art

Generally, the light scanning unit is adapted to be used by an apparatus, such as a laser printer, a digital copying machine, a bar-code reader, and a facsimile. A latent image is formed on a photosensitive medium through primary scanning by a beam deflector and secondary scanning by rotation of the photosensitive medium.

Referring to FIG. 1, the general light scanning unit includes: a light source 1 for generating and illuminating light. A beam deflector 7 deflects incident light so that a beam emitted from the light source 1 may be illuminated onto a surface of a photosensitive medium 15. An f-θ lens corrects an aberration included in the beam deflected by the beam deflector 7. A reflection mirror 13 directs an incident scanning line to the photosensitive medium 15 by reflecting the incident scanning line. Also, a collimating lens 3 condenses diversed light illuminated from the light source 1 to change the light into parallel light. A cylindrical lens 5 aligns this parallel light and is disposed in an optical path between the light source 1 and the beam deflector 7.

The light source 1 includes a laser diode that is on and off controlled by a control circuit. Therefore, the light source 1 illuminates a modulated beam according to an image signal. The beam deflector 7 includes a driving source 8 for providing rotational force and a polygonal mirror 9 rotatably installed on the driving source 8. The polygonal mirror 9 includes a plurality of reflection planes 9a for reflecting an incident beam. Therefore, when a single beam is illuminated onto the polygonal mirror 9, as many scanning lines are formed as the number of reflection planes 9a whenever the polygonal mirror 9 rotates one time.

A multi-beam scanning unit meets the requirements of high speed and high resolution apparatus, such as a laser printer, which uses the light scanning unit. The multi-beam scanning unit has a plurality of laser diodes as a light source, which are respectively on and off controlled independently. Multi-beams are simultaneously illuminated so that several scanning lines can be simultaneously provided on the photosensitive medium. According to the multi-beam scanning unit, as many scanning lines are formed as the number of reflection planes 9a multiplied by the number of the illuminated multi-beams whenever the polygonal mirror 9 rotates one time.

The light scanning unit or the multi-beam scanning unit having the foregoing constructions forms a line image 16 on the photosensitive medium 15 while the light source 1 is turned on and off. The photosensitive medium 15, which includes a photosensitive drum or a photosensitive belt operated to be rotatable, moves perpendicularly with respect to a scanning plane formed by the scanning lines constituting the line image 16. Therefore, the line image 16 is formed by the scanning unit and a two-dimensional image can be formed on the photosensitive medium 15 by movement of the photosensitive medium 15.

When the scanning line is formed on the photosensitive medium by the light scanning unit using a single laser diode as a light source, the photosensitive medium 15 is moved as much as a width that corresponds to the resolution while one scanning line is scanned by the beam deflector 7.

When the scanning line is formed on the photosensitive medium by the multi-beam scanning unit using a plurality of laser diodes as a light source, a plurality of scanning lines are simultaneously scanned onto the photosensitive medium by one reflection plane of the polygonal mirror. Referring to FIG. 2, presuming that lines simultaneously formed by the one reflection plane are a K-line and a line formed by the adjacent reflection plane is a K+1 line, the K-line includes simultaneously scanning lines 1, 2, . . . , n in the primary scanning direction with respect to the photosensitive medium at a predetermined interval.

The photosensitive medium 15 moves in the secondary direction (exposed-surface transferring direction) at a predetermined speed determined depending on the whole width of a plurality of scanning lines and a scanning time.

Namely, presuming that a number of laser diodes is n, a resolution is D, a rotational linear velocity of the photosensitive medium is v, a time for which one reflection plane of the polygonal mirror constituting the beam deflector rotates is t, and a movement distance of the photosensitive medium while one reflection plane of the polygonal mirror rotates is S, then S satisfies Equation 1 below.

$$S = v \times t = \frac{n \times 25.4}{D} [mm] \quad (1)$$

According to the multi-beam scanning unit having the foregoing construction, since line images by a plurality of lines (K-line) are simultaneously formed on the photosensitive medium, the line image can be formed in high speed even if the beam deflector is rotated at a low speed. Therefore, compared with the light scanning unit using a single laser diode as a light source, the multi-beam scanning unit having n laser diodes as a light source can realize the same scanning speed even if the rotational speed of the polygonal mirror having the same number of reflection planes is decreased to 1/n.

According to the multi-beam scanning unit, an exposed surface of the photosensitive medium moves a distance S while one reflection plane scans n scanning lines, as shown in FIG. 2. At this point, presuming that an effective scanning rate is ϵ, a distance the photosensitive medium moves while an effective scanning area is scanned is p, $t_1$ for which the effective scanning area of the photosensitive medium is scanned is given by Equation 2 below:

$$t_1 = t \times \epsilon, \; p = S \times \epsilon, \; \epsilon < 1 \quad (2)$$

Here, the effective scanning rate ϵ is given by a ratio of a length (or a time) the effective printing area is scanned to a total length (or a time) one reflection plane of the polygonal mirror is scanned, and generally has a value of 0.5 through 0.8.

Since the photosensitive medium moves in a linear velocity v, the photosensitive medium moves a distance p for a time $t_1$ presuming that a start point of the effective scanning area is a and its end point is b. Resultantly, the start point a and the end point b cannot be located on the same scanning plane and skew, i.e., an inclination is generated as much as p. In the meantime, as the effective scanning rate ϵ becomes small, the inclination of the scanning line is reduced. However, in that case, there exists a weak point that a flickering frequency of an image signal is increased.

Though a problem of skew generation in the scanning line in the multi-beam scanning unit has been described in here, such a problem still exists in the light scanning unit having a single laser diode as a light source.

Accordingly, there is a need for an improved light scanning unit having an obliquely disposed reflection mirror to correct skewed scanning lines.

SUMMARY OF THE INVENTION

The present invention provides a light scanning unit having an improved structure capable of correcting a skew of a scanning line.

According to an aspect of the present invention, a light scanning unit scans light onto an exposed surface of a photosensitive medium. The light scanning unit includes a light source for generating and illuminating at least one beam that corresponds to an image signal while being controlled on and off. A beam deflector deflects and scans a beam provided from the light source. A reflection mirror is obliquely arranged so that a scanning line directed to the exposed surface may be inclined with respect to a segment perpendicular to a transferring direction of the exposed surface to direct the scanning line to the exposed surface of the photosensitive medium by reflecting the scanning line provided from the beam deflector.

According to another aspect of the present invention, a light scanning unit scans light on an exposed surface of a photosensitive medium and includes a light source for generating and illuminating at least one beam that corresponds to an image signal while being controlled on and off. A collimating lens converges light by condensing a beam illuminated from the light source. A beam deflector has a driving source and a polygonal mirror rotatable by the driving source to deflect and scan an incident beam. A cylindrical lens is arranged between the collimating lens and the beam deflector to linearly focus a beam passing through the collimating lens onto the beam deflector. An f-θ lens focuses a beam onto a photosensitive medium by correcting the beam deflected from the beam deflector with different magnifications with respect to a primary and a secondary scanning directions. A reflection mirror is obliquely arranged so that a scanning line directed to the exposed surface may be inclined with respect to a segment perpendicular to a transferring direction of the exposed surface to direct the scanning line to the exposed surface of the photosensitive medium by reflecting the scanning line provided from the beam deflector.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The above and other features and advantages of the present invention will become more apparent by describing in detail exemplary embodiments thereof with reference to the attached drawings, in which.

Throughout the drawings, like reference numerals will be understood to refer to like parts, components and structures.

DETAILED DESCRIPTION OF EXEMPLARY EMBODIMENTS

Figure 1:
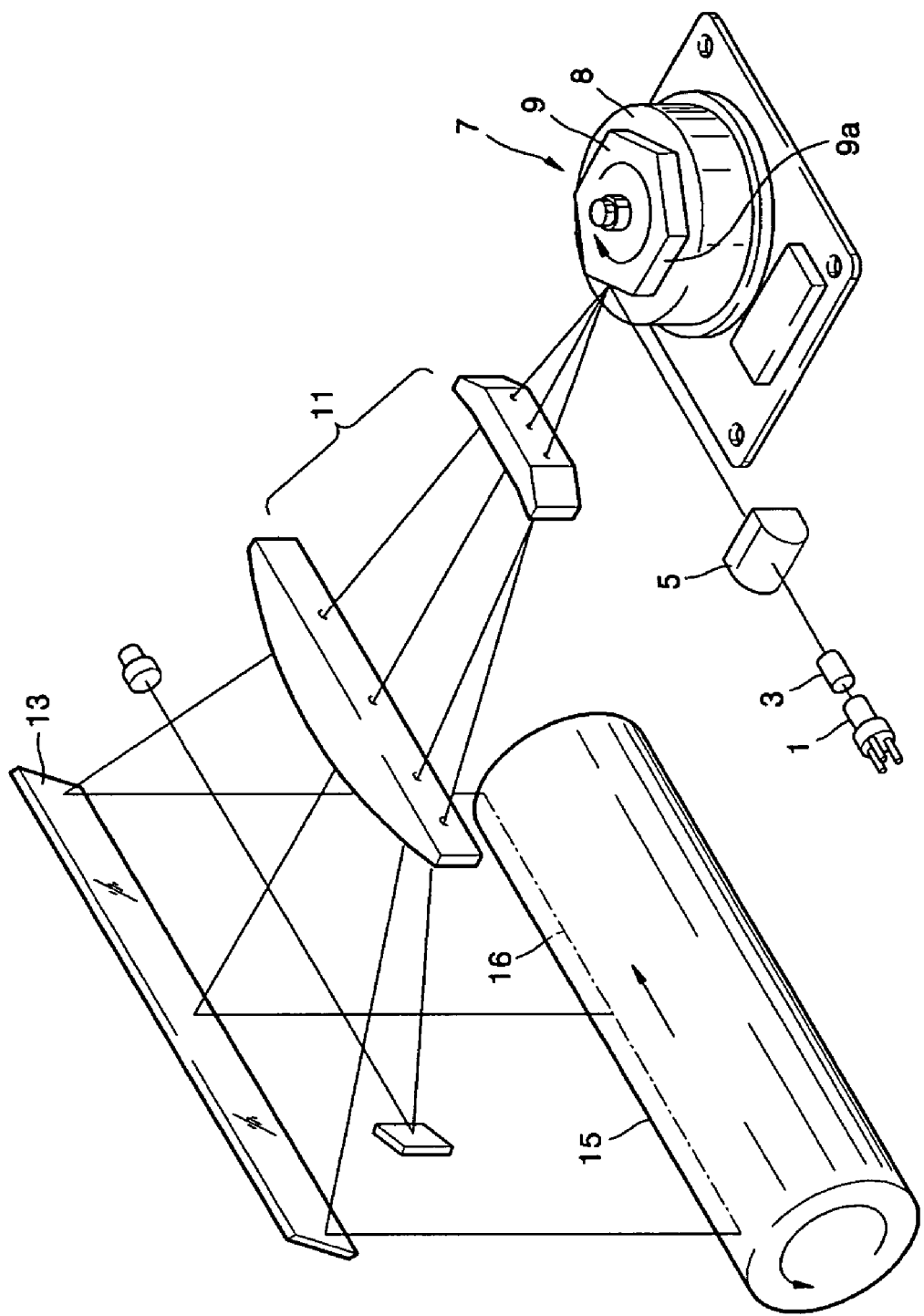
FIG. 1 is a perspective view schematically showing an optical arrangement of a conventional light scanning unit.
Figure 2:
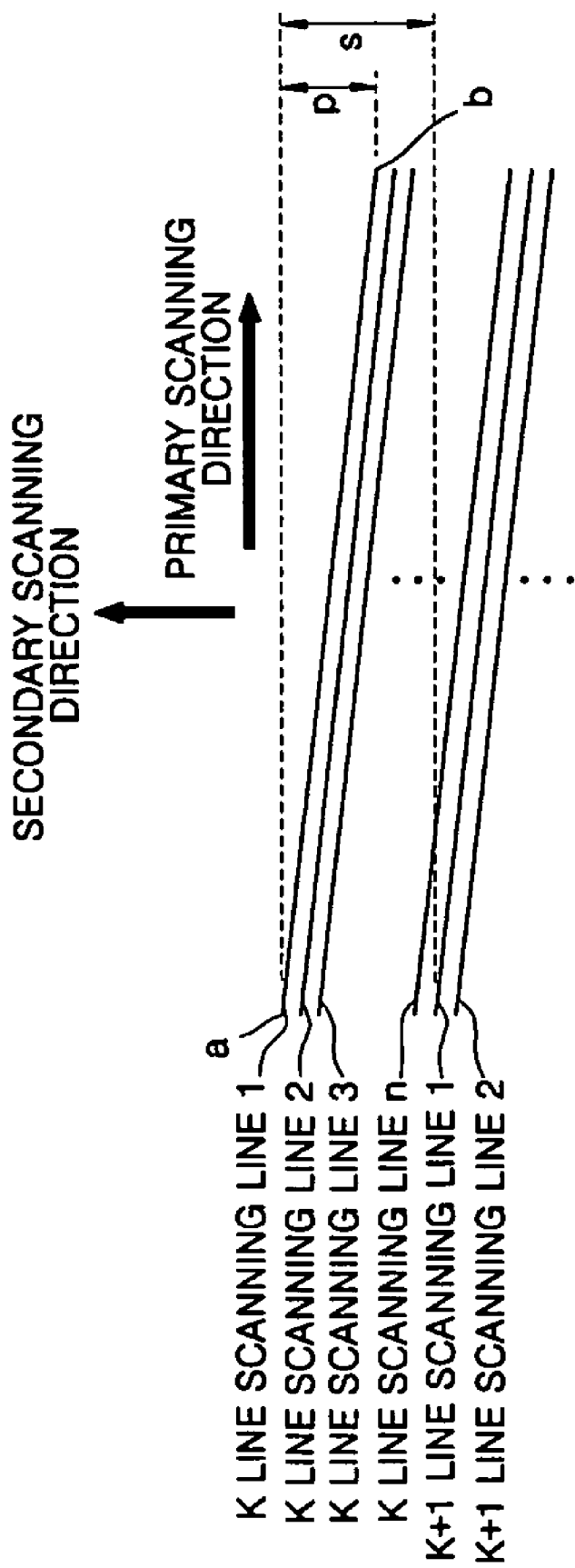
FIG. 2 is a conceptual view of a scanning operation of a conventional multi-beam scanning unit.
Figure 3:
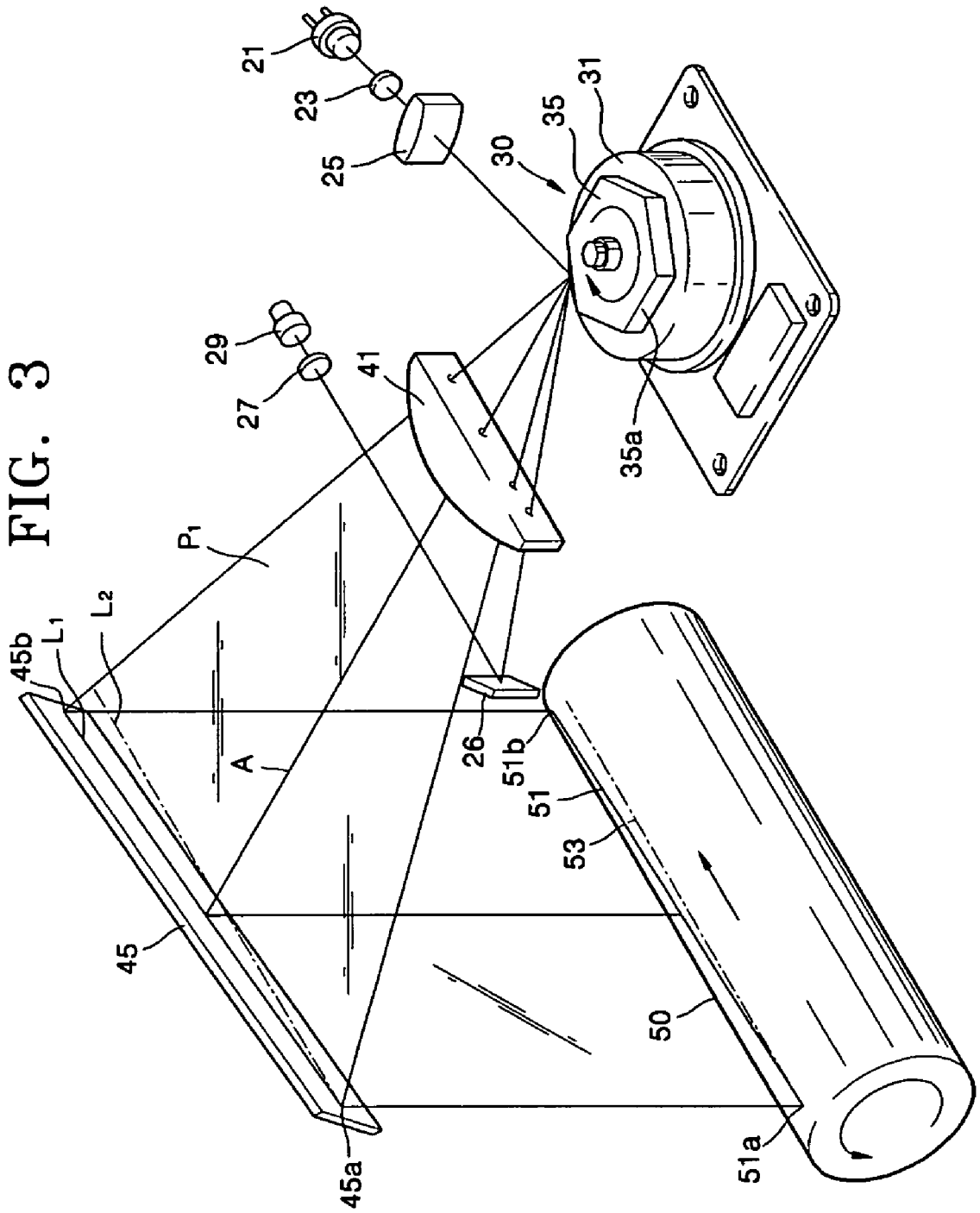
FIG. 3 is a perspective view schematically showing an optical arrangement of the light scanning unit according to an exemplary embodiment of the present invention.
Figure 4:
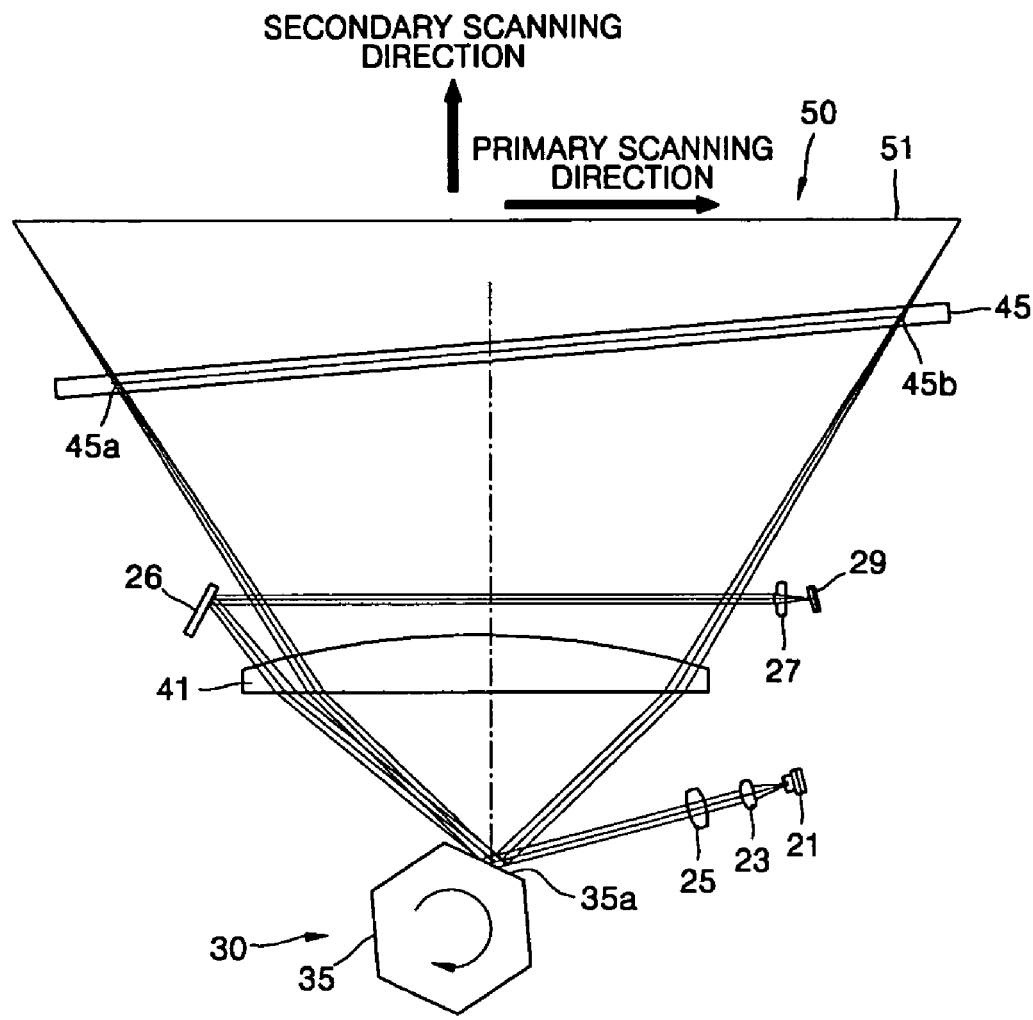
FIG. 4 is a plan view of the light scanning unit of FIG. 3.

Referring to FIGS. 3 and 4, the light scanning unit according to an exemplary embodiment of the present invention scans light onto a photosensitive medium 50 whose exposed surface is moved in one direction, i.e., a secondary scanning direction, and includes a light source 21, a beam deflector 30, and a reflection mirror 45.

The light source generates and illuminates at least one beam that corresponds to an image signal under control of an operation circuit. Preferably, the light source 21 includes elements such as a semiconductor laser and an LED (light emitting diode). The light source 21 illuminates a single beam or multi-beams. Since the construction of the light source 21 itself is widely known in the art, a detailed description thereof is omitted.

The beam deflector 30 deflects and scans the light illuminated from the light source 21 in a primary scanning direction of the photosensitive medium 50. For such a beam deflector 30, a polygonal mirror unit of the illustrated structure may be taken as an example. The polygonal mirror unit includes a driving source 31 and a polygonal mirror 35 installed rotatable by the driving source 31. The polygonal mirror 35, which has a plurality of reflection planes 35a on its side, deflects and scans incident light while being rotated.

The beam deflector 30 is not limited to the polygonal mirror unit of the described structure. Alternatively, a hologram-disk-type beam deflector for deflecting and scanning an incident beam or a galvano-mirror-type scanning unit may be used.

Preferably, a collimating lens 23 and the cylindrical lens 25 are additionally provided in an optical path between the light source 21 and the beam deflector 30. The collimating lens 23 condenses the beam illuminated from the light source 21 into a parallel light beams or a converging light beams. The cylindrical lens 25 linearly focuses the beam passing through the collimating lens 25 onto the beam deflector 30.

The reflection mirror 45 reflects a scanning line provided from the beam deflector 30 to form a scanning line 51 on an exposed surface of the photosensitive medium 50.

The reflection mirror 45 is obliquely arranged in such a way that the scanning line 51 directed to the exposed surface may be at a right angle to a transferring direction (a secondary scanning direction) of the photosensitive medium 50 and may be inclined with respect to a segment 53 positioned on the photosensitive medium 50. The reflection mirror 45 is arranged in such a way that a segment $L_1$ formed by mutual contact between a reflection plane of the reflection mirror 45 and a scanning plane $P_1$ formed by the beams scanned from the beam deflector 30 may have a predetermined slope with respect to a segment $L_2$ perpendicular to a central scanning axis A on the scanning plane $P_1$.

Preferably, the reflection mirror 45 is arranged in such a way that an optical path between the light source 21 and a scan starting point 45a on the reflection mirror 45 is shorter than an optical path between the light source 21 and a scan ending point 45b on the reflection mirror 45.

Figure 5:
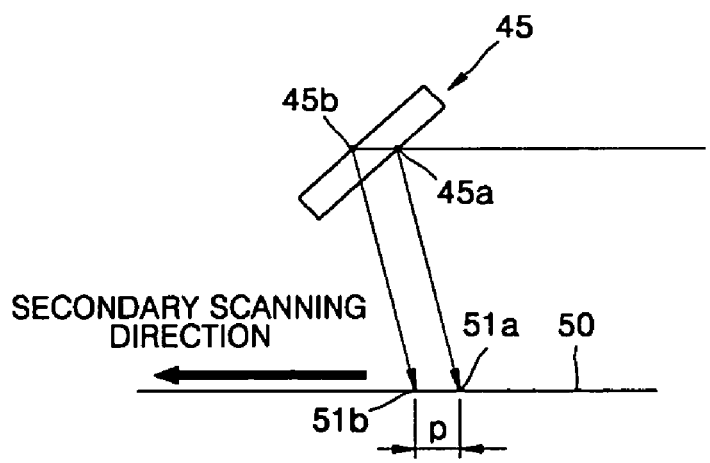
FIG. 5 is a schematic view showing an inclined scanning operation of the light scanning unit according to an exemplary embodiment of the present invention.

More preferably, the reflection mirror 45 is obliquely arranged in such a way that a deviation p is generated between a front end position 51a and an end position 51b of the beam reflected and focused onto the photosensitive medium 50, as shown in FIG. 5. The front end position 51a of the beam represents a position of the beam reflected from the scan starting point 45a and focused onto the photosensitive medium 50, and the end position 51b of the beam represents a position of the beam reflected from the scan ending point 45b and focused onto the photosensitive medium 50. The deviation p represents a distance the photosensitive medium 50 moves in the secondary scanning direction while the primary scanning is performed with respect to the effective scanning area.

Preferably, the light scanning unit according to an exemplary embodiment of the present invention additionally includes an f-θ lens 41 and a synchronizing signal detector.

The f-θ lens 41 is arranged on an optical path between the beam deflector 30 and the reflection mirror 45. The f-θ lens 41, which includes at least one lens, focuses a beam onto a photosensitive medium 50 by correcting the beam deflected from the beam deflector 30 with different magnifications with respect to the primary and the secondary scanning directions. The secondary scanning direction means the rotation direction of the photosensitive medium 50 and the primary scanning direction means an axial direction of the photosensitive medium, i.e., the direction to which the beam is deflected by the beam deflector 30.

The synchronizing signal detector receives part of the beam illuminated from the light source 21 to synchronize a horizontal sync. For that purpose, the synchronizing signal detector includes a synchronizing signal detection sensor 29 for receiving part of the beam deflected by the beam deflector 30 and passing through the f-θ lens 41. A mirror 26 is arranged between the f-θ lens 41 and the synchronizing signal detection sensor 29 to change a progression path of an incident beam. A focusing lens 27 focuses the beam reflected from the mirror 26.

Operation of the light scanning unit according to an exemplary embodiment of the present invention will be described with a multi-beam scanning unit using a plurality of laser diodes as a light source.

Figure 6:
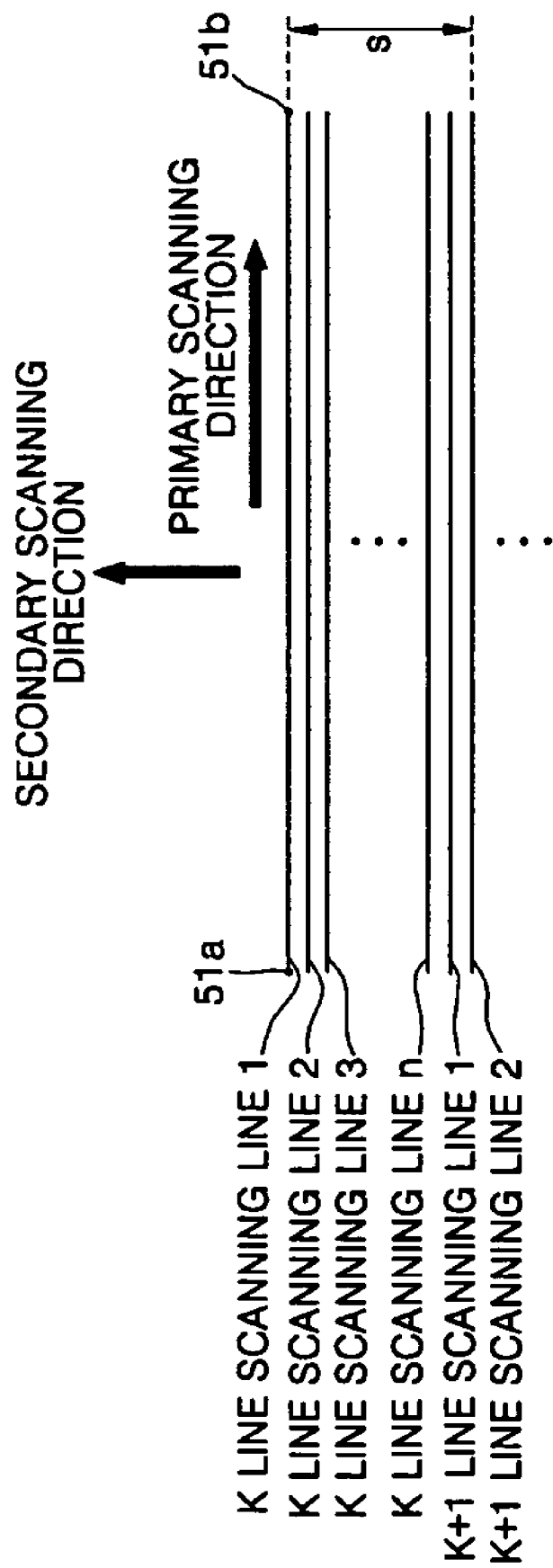
FIG. 6 is a diagrammatic illustration of a scanning line when multi-beams are scanned by the light scanning unit according to an exemplary embodiment of the present invention.

Referring to FIG. 6, a plurality of scanning lines are simultaneously scanned onto the photosensitive medium (refer to the reference numeral 50 in FIG. 3) by one reflection plane of the polygonal mirror 35. Presuming that the lines simultaneously formed by one reflection plane are K-line and a line formed by the adjacent reflection plane is K+1, the K-line includes scanning lines 1, 2, ..., n simultaneously in the primary scanning direction onto the photosensitive medium 50 at a predetermined interval.

At this point, movement of the photosensitive medium 50 in the secondary scanning direction (the transferring direction of the exposed surface) is determined depending on the whole width of a plurality of scanning lines and the scanning time. At this point, the movement distance S of the photosensitive medium while one reflection plane of the polygonal mirror rotates satisfies the above Equation 1. At this point, presuming that the effective scanning rate is ε, a distance p the photosensitive medium moves while scanning is performed with respect to the effective scanning area satisfies the above Equation 2.

According to an exemplary embodiment of the present invention, the reflection mirror 45 is obliquely arranged in such a way that the deviation p is generated between the front end position 51a and the end position 51b of the beam. The photosensitive medium moves the distance p while scanning is performed with respect to the effective scanning area. Therefore, the scanning line of the K-line or the K+1 line focused onto the moving photosensitive medium becomes a horizontal line which is at right angle to the secondary scanning direction, as shown in FIG. 6.

The light scanning unit according to an exemplary embodiment of the present invention corrects skew, i.e., an inclination of a scanning line focused onto the photosensitive medium, so that the skew may be corrected into a horizontal line, by obliquely arranging the reflection mirror. Therefore, improving printing quality.

Also, the multi-beam scanning unit obtains an improved printing quality as well as realizing high speed scanning by correcting skew between a plurality of scanning lines.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light scanning unit for scanning light on an exposed surface of a photosensitive medium, comprising:
    a light source to generate and illuminate at least one beam that corresponds to an image signal while being controlled on and off;
    a beam deflector to deflect and scan a beam provided from the light source; and
    a reflection mirror obliquely arranged so that a segment formed by a projection plane of the reflection mirror onto the exposed surface is maintained inclined with respect to a segment perpendicular to a transferring direction of the exposed surface to direct the scanning line to the exposed surface of the photosensitive medium by reflecting the scanning line provided from the beam deflector, the reflection mirror being arranged such that an optical path between the light source and a scan starting point on the reflection mirror is shorter than an optical path between the light source and a scan ending point on the reflection mirror.

2. The light scanning unit of claim 1, wherein
    the reflection mirror is arranged such that the segment formed by mutual contact between the reflection plane of the reflection mirror and a scanning plane formed by the beams scanned from the beam deflector has a predetermined slope with respect to a segment perpendicular to a central scanning axis on the scanning plane.

3. The light scanning unit of claim 2, wherein
    the beam deflector has a driving source, and a polygonal mirror rotatable by the driving source to deflect and scan an incident beam.

4. The light scanning unit of claim 2, wherein
    an f-θ lens is arranged between the beam deflector and the reflection mirror to focus light onto a photosensitive medium by correcting the light deflected from the beam deflector with different magnifications with respect to primary and secondary scanning directions.

5. The light scanning unit of claim 2, wherein
a collimating lens is arranged in an optical path between the light source and the beam deflector to condense a beam illuminated from the light source into parallel or converging light beams; and
a cylindrical lens linearly focuses a beam passing through the collimating lens onto the beam deflector.

6. The light scanning unit of claim 1, wherein
the beam deflector has a driving source, and a polygonal mirror rotatable by the driving source to deflect and scan an incident beam.

7. The light scanning unit of claim 1, wherein
an f-θ lens is arranged between the beam deflector and the reflection mirror to focus light onto a photosensitive medium by correcting the light deflected from the beam deflector with different magnifications with respect to primary and secondary scanning directions.

8. The light scanning unit of claim 1, wherein
a collimating lens is arranged in an optical path between the light source and the beam deflector to condense a beam illuminated from the light source to change the beam into parallel or converging light beams; and
a cylindrical lens linearly focuses a beam passing through the collimating lens onto the beam deflector.

9. A light scanning unit for scanning light onto an exposed surface of a photosensitive medium, comprising:
a light source to generate and illuminate at least one beam that corresponds to an image signal while being controlled on and off;
a collimating lens to condense a beam illuminated from the light source to change the beam into parallel or converging light beams;
a beam deflector having a driving source and a polygonal mirror rotatable by the driving source to deflect and scan an incident beam;
a cylindrical lens arranged between the collimating lens and the beam deflector to linearly focus a beam passing through the collimating lens onto the beam deflector;
an f-θ lens to focus a beam onto a photosensitive medium by correcting the beam deflected from the beam deflector with different magnifications with respect to a primary and a secondary scanning directions; and
a reflection mirror obliquely arranged so that a segment formed by a projection plane of the reflection mirror onto the exposed surface is maintained inclined with respect to a segment perpendicular to a transferring direction of the exposed surface to direct the scanning line to the exposed surface of the photosensitive medium by reflecting the scanning line provided from the beam deflector, the reflection mirror being arranged such that an optical path between the light source and a scan starting point on the reflection mirror is shorter than an optical path between the light source and a scan ending point on the reflection mirror.

10. The light scanning unit of claim 9, wherein
the reflection mirror is arranged such that the segment formed by mutual contact between the reflection plane of the reflection mirror and a scanning plane formed by the beams scanned from the beam deflector has a predetermined slope with respect to a segment perpendicular to a central scanning axis on the scanning plane.

11. The light scanning unit of claim 9, wherein
a synchronizing signal detector is disposed between the f-θ lens and the reflection mirror to synchronize a horizontal sync of the light illuminated and generated by the light source.

12. The light scanning unit of claim 11, wherein
a synchronizing signal detection sensor receives a part of the beam deflected by the beam deflector that passes through the f-θ lens.

13. The light scanning unit of claim 12, wherein
a mirror is disposed between the f-θ lens and the synchronizing signal detection sensor to change a progression path of an incident beam.

14. The light scanning unit of claim 13, wherein
a focusing lens is disposed between the mirror and the synchronizing signal detection sensor to focus the beam reflected from the mirror.

* * * * *